W. J. STEINLE.
APPARATUS FOR MANUFACTURING SOLID TIRES.
APPLICATION FILED FEB. 9, 1916.
1,356,891.
Patented Oct. 26, 1920.
3 SHEETS—SHEET 2.
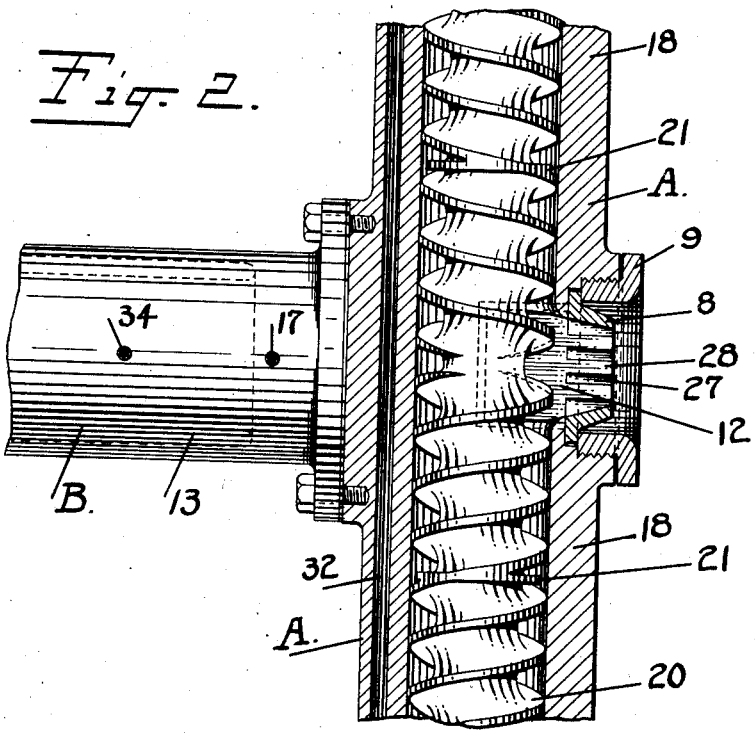
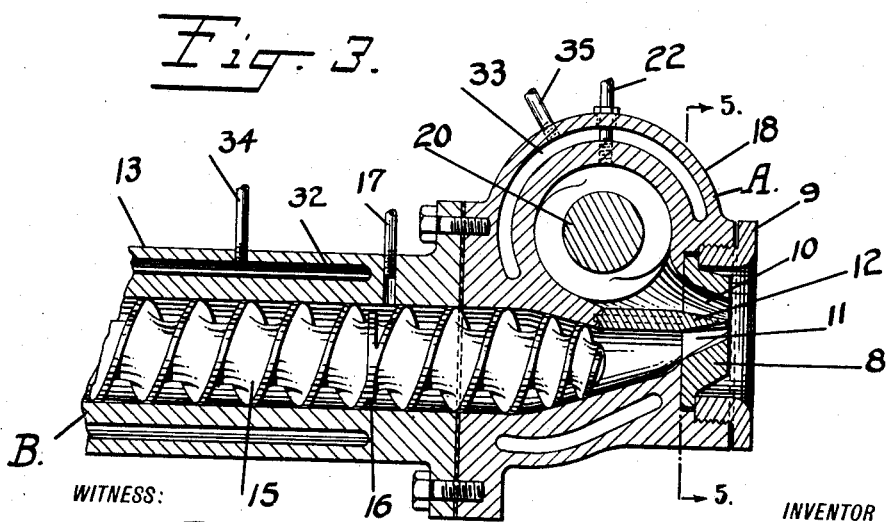
WITNESS:
S. G. Taylor.
INVENTOR
William J. Steinle,
BY
Ernest Hopkinson
HIS ATTORNEY W. J. STEINLE.
APPARATUS FOR MANUFACTURING SOLID TIRES.
APPLICATION FILED FEB. 9, 1916.

1,356,891.

Patented Oct. 26, 1920.

WITNESS:

INVENTOR
William J. Steinle,
BY
HIS ATTORNEY

UNITED STATES PATENT OFFICE.

WILLIAM J. STEINLE, OF ELMHURST HEIGHTS, NEW YORK, ASSIGNOR TO MORGAN & WRIGHT, A CORPORATION OF MICHIGAN.

APPARATUS FOR MANUFACTURING SOLID TIRES.

1,356,891. Specification of Letters Patent. Patented Oct. 26, 1920.

Application filed February 9, 1916. Serial No. 77,134.

*To all whom it may concern:*

Be it known that I, WILLIAM J. STEINLE, a citizen of the United States, residing at Elmhurst Heights, Long Island, county of Queens, State of New York, have invented certain new and useful Improvements in Apparatus for Manufacturing Solid Tires, of which the following is a full, clear, and exact description.

This invention relates to apparatus for manufacturing solid tires, and has for an object to generally improve and simplify the manufacture of this type of tire and to produce unitary, integral association of the different materials in the tire.

One method of manufacturing solid tires, particularly those made on tubing machines, embodies tubing the tread and base separately. Frequently the base is calendered. The base, either calendered or tubed of hard rubber compound, is applied to a metal rim and partially vulcanized thereon. The tread of soft rubber compound, tubed to the required size and shape, is applied to the above mentioned partially vulcanized base by rolling or hammering to work the contacting surfaces of the tread and base together. The tire, thus assembled upon its rim, is then inclosed in a mold which is placed in a vulcanizer, where the desired degree of vulcanization is produced in the rubber.

The above outlined method requires very careful manipulation of the materials, and the results are appreciably influenced by many personal factors. To eliminate these and provide a better product at a reduced cost, the present invention contemplates simultaneously forming and uniting the tread and base in such a manner as to produce unitary, integral association of these two components of the tire.

The invention can be readily understood from the following description, taken in connection with the accompanying drawings, in which—

Fig. 2 is a fragmentary view showing the delivery portion of the apparatus in section.

Fig. 3 is a cross-sectional view on the line 3—3, Fig. 1.

Figure 1:
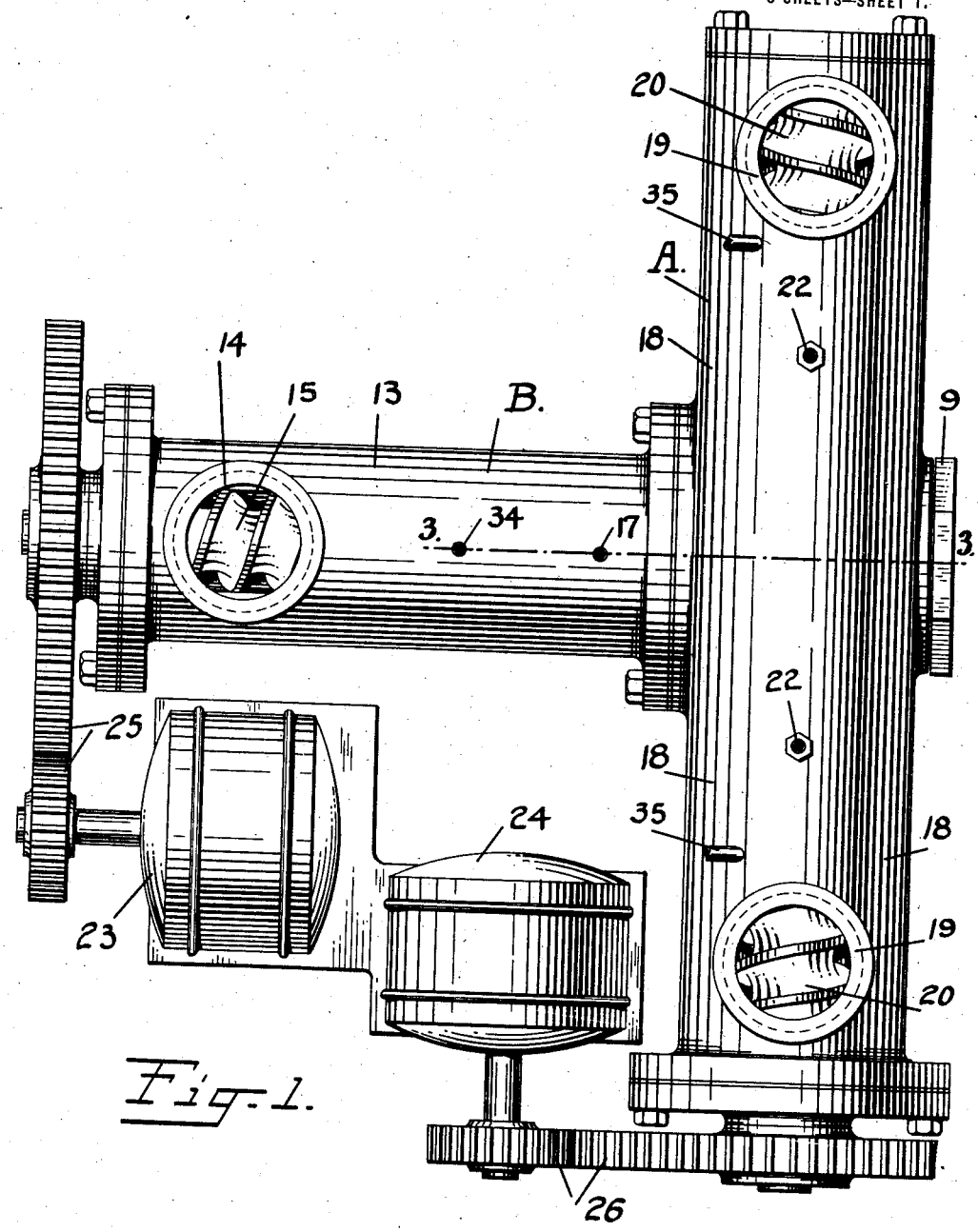
Figure 1 is a plan view showing apparatus suitable for carrying out the invention.
Figures 4, 5:
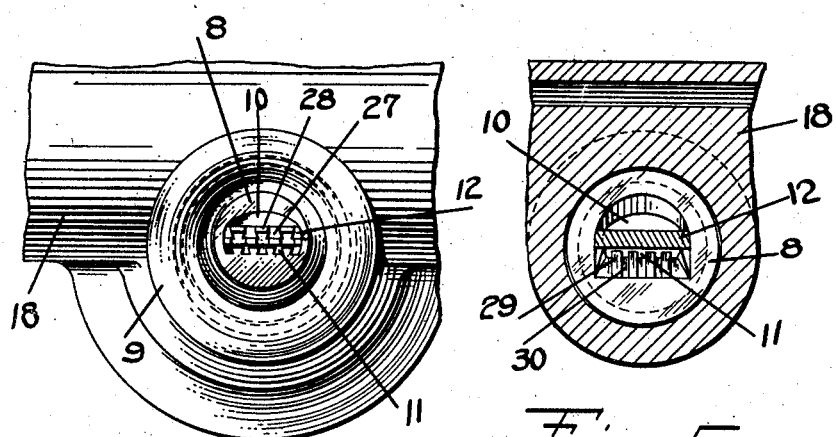
Fig. 4 is a detail view in elevation of the delivery portion of the apparatus.
Fig. 5 is a cross-sectional view on the line 5—5, Fig. 3.
Figures 6, 7:
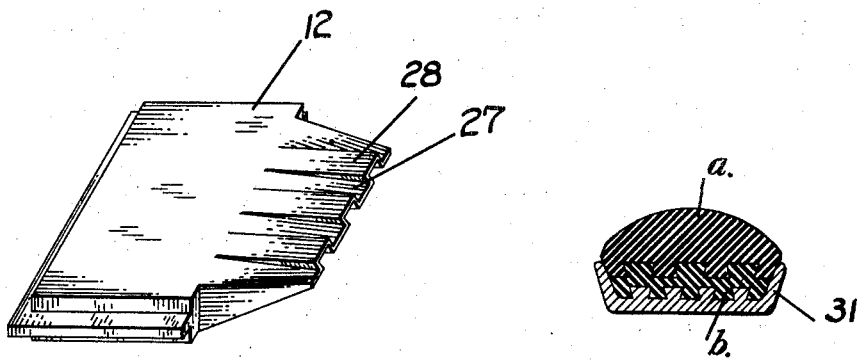
Fig. 6 is a detail perspective view of the die tongue.
Fig. 7 is a cross a cross-sectional view of the assembled tire and rim.

The apparatus in its preferred form, comprises a side delivery tubing machine A, and an end delivery tubing machine B, coupled together so as to discharge simultaneously through a common outlet, there being a die 8 held in place in the outlet by a lock ring 9. The die is divided into two separate converging passages 10—11 of the general shape of the tread and base respectively, to be formed, by a tongue 12.

Preferably the end delivery tubing machine B is arranged to carry the hard rubber composition, of which the base of the tire is composed, the same being fed into the casing 13 of the machine through a hopper 14 and being conveyed to the die by a worm 15. Preferably the rubber stock is caused to pass as a film or sheet over a collar 16 on the worm and thus is opened up to the action of sub-atmospheric pressure through an exhaust pipe 17, with consequent withdrawal of air, gases and fluids, from the rubber to compact and densify the same.

The side delivery tubing machine A is arranged to carry the soft rubber composition, of which the tread of the tire is composed, the same being fed into the machine at both ends of the casing 18 through hoppers 19, and being carried to the center of the machine by a worm 20 having one-half right threaded, and the other half left threaded. Preferably the tread stock is also evacuated during its passage along the worm, for this purpose there being filming collars 21 on the worm which open the stock in sheet form to the action of an exhaust, exerted through pipes 22.

The center of the worm 20 overlies the end of the worm 15 and both worms discharge simultaneously into the respective chambers in the die formed by the separating tongue 12. The worms 15—20 of the tubing machines are, in the present embodiment, shown as being driven by separate motors 23—24, and corresponding gear trains 25—26 although this is not essential as both worms may be simultaneously driven from any desired source of power.

In practice, the hard rubber composition for the tire base $b$ is compounded so as to vulcanize in the same time as the rubber composition for the tire tread a. The rubber compounds are then fed into the respective tubing machines, wherein they are forced toward the die 8 or passages 10—11, and are kept separated by the tongue 12 until well within the die. The tongue 12 is tapered toward its front edge and is provided with alternating depressions and elevations 27—28, which impart surfaces of dove-tail formation to the rubber compositions of the tread and base. Both the tread and base will be caused to interfit as they meet at the edge of the separating tongue and will be there forced into intimate unitary and integral association by the surrounding wall of the die.

In the present embodiment the wall of the die is provided with alternating elevations and depressions 29—30 so that the surface of the base which contacts with the rim 31 will partake of the dove-tail configuration of the rim. However, any other configuration may be imparted to the base to correspond with a similar configuration of the rim. So also, the interlocking surfaces of the tread and base produced by the separating tongue, may be of other configuration than dove-tail.

To avoid oxidation of the surface of the tire base, it is desirable to apply the tire to the rim 31 as soon as possible after formation of the tire as above described, and this may be done by cutting the tire to the proper length, drawing it over the rim, and splicing the ends together.

I also contemplate applying the tire to the rim in a chamber which is evacuated of air, whereby the rubber is pressed into the locking surfaces of the rim without danger of entrapped air between the tire and rim.

To complete the process, the tire, thus assembled upon its rim, is inclosed in a mold which is placed in a vulcanizer, where the desired degree of vulcanization is produced in the rubber.

It is desirable that the base and tread stocks be controlled as to temperature en route to the die and for this purpose the present embodiment of the invention shows the casings 13—18 of the tubing machines as formed with chambers 32—33 into which a heat medium may be admitted through pipes 34—35.

While I have described and illustrated a specific apparatus, and outlined a specific sequence of manipulation of materials in producing the associated tire and rim, I do do not limit myself to the specific apparatus nor to the specific sequence of manipulation, since various modifications may be resorted to within the scope of the appended claims without departing from the spirit or sacrificing any of the advantages of the invention.

Having thus described my invention, what I claim as new and desire to protect by Letters Patent is:

1. Apparatus of the class described for making articles from different plastic materials comprising a casing, a die located adjacent an intermediate portion of said casing and communicating therewith, a second casing in communication with the die for directing material thereto and arranged transverse the first-mentioned casing, and worms in each of said casings for continuously feeding material therethrough and extruding the same from the die, the opposite ends of one of said worms being reversely threaded.

2. Apparatus of the class described for making articles from different plastic materials including in combination, casings, worms in said casings for continuously feeding material therethrough, a die arranged laterally of one of said casings at a point intermediate the ends of the worm therein, and means defining separate closed passages from the die to each of said casings, said passages and casings being wholly separate from each other so as to prevent the materials from intermingling in their movement to the die.

3. Apparatus of the class described for making articles from different plastic materials comprising, a die, separate casings each having a separate closed outlet to said die, means in said casings for continuously feeding the materials through said die, a tongue spaced from and independent of the feeding means for directing the materials in separate masses to the die, means within said casings for filming the material in its passage to the die, and means for evacuating the interior of the casings at a point adjacent the filming means.

4. Apparatus of the class described for making articles from different plastic materials comprising, a die, separate casings each having a separate closed outlet to said die, means in said casings for continuously feeding the materials through said die, and a tongue for directing the materials in separate masses to the die, said tongue terminating in a free end adjacent the delivery face of the die.

5. In a tubing machine for plastic materials, in combination, a plurality of casings each having an inlet and an outlet, a rotatable worm in each casing between said inlet and outlet for conveying material therethrough, and means for continuously rotating said worms to uninterruptedly feed the materials through the said outlets, said outlets terminating in contiguous free discharge openings whereby materials exuded through the openings in a predetermined contacting relation are free and unconfined immediately after they have been brought together in order to prevent their intermingling.

6. In a tubing machine a plurality of casings each having an inlet and an outlet, a rotatable worm in each casing between the inlet and outlet for conveying the material therethrough, and controllable means adapted to continuously rotate the said worms at desired relative speeds to regulate the relative quantities of material fed through said outlets, said outlets terminating in contiguous free discharge openings.

7. In a tubing machine for plastic materials, a plurality of casings each having an inlet and an outlet, a rotatable worm in each casing between the inlet and outlet for conveying the material therethrough, and controllable means for continuously rotating the said worms at variable relative speeds to regulate the relative quantities of material fed through said outlets, said outlets terminating in contiguous free discharge openings whereby materials exuded through the openings in a predetermined contacting relation are free and unconfined immediately after they have been brought together in order to prevent their intermingling.

Signed at New York, N. Y., this 7 day of Feb., 1916.

WILLIAM J. STEINLE.